(12) United States Patent
Hanatani et al.

(10) Patent No.: US 10,673,713 B2
(45) Date of Patent: Jun. 2, 2020

(54) COMMUNICATION CONTROL DEVICE, COMMUNICATION DEVICE, AND COMPUTER PROGRAM PRODUCT FOR DYNAMIC GROUP MANAGEMENT

(71) Applicant: Kabushiki Kaisha Toshiba, Minato-ku (JP)

(72) Inventors: Yoshikazu Hanatani, Kawasaki (JP); Toru Kambayashi, Chigasaki (JP); Fangming Zhao, Fuchu (JP); Yoshihiro Oba, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 627 days.

(21) Appl. No.: 14/644,032

(22) Filed: Mar. 10, 2015

(65) Prior Publication Data

US 2015/0188785 A1 Jul. 2, 2015

Related U.S. Application Data

(63) Continuation of application No. PCT/JP2013/066538, filed on Jun. 11, 2013.

(30) Foreign Application Priority Data

Nov. 2, 2012 (JP) ................. 2012-243157

(51) Int. Cl.
*H04L 12/26* (2006.01)
*H04L 9/08* (2006.01)

(52) U.S. Cl.
CPC ........... *H04L 43/04* (2013.01); *H04L 9/0836* (2013.01); *H04L 9/0891* (2013.01)

(58) Field of Classification Search
CPC ........ G11B 20/00086; G11B 20/00115; G11B 20/0021; G11B 20/00246;
(Continued)

(56) References Cited

U.S. PATENT DOCUMENTS

2002/0150250 A1 10/2002 Kitaya et al.
2004/0120529 A1* 6/2004 Zhang ................. H04L 9/0822
380/278
(Continued)

FOREIGN PATENT DOCUMENTS

JP 2001-358705 A 12/2001
JP 2005-4263 A 1/2005
(Continued)

OTHER PUBLICATIONS

Office Action dated Jul. 26, 2016 in Japanese Patent Application No. 2012-243157 (with unedited computer generated English language translation).
(Continued)

*Primary Examiner* — Philip J Chea
*Assistant Examiner* — Mohammed Ahmed
(74) *Attorney, Agent, or Firm* — Oblon, McClelland, Maier & Neustadt, L.L.P.

(57) ABSTRACT

A communication control device includes an extracting unit and an output unit. The extracting unit extracts, from a media key block containing a plurality of elements, partial information that contains elements which can be processed by a communication device having a device ID thereof identified in identification information for identifying one or more device IDs. The output unit outputs a group ID for identifying a group, the identification information, and the partial information, to a plurality of the communication devices that include all of the communication devices belonging to the group.

2 Claims, 8 Drawing Sheets

(58) Field of Classification Search
CPC ........ G11B 20/00347; G11B 20/00362; G11B 20/00442; G11B 20/00449; G11B 20/10; G11B 20/00434; H04L 9/0822; H04L 9/0833

See application file for complete search history.

(56) References Cited

U.S. PATENT DOCUMENTS

| | | | |
|---|---|---|---|
| 2005/0038997 A1* | 2/2005 | Kojima | G11B 20/00086 713/165 |
| 2005/0198170 A1* | 9/2005 | LeMay | H04L 63/045 709/206 |
| 2005/0229257 A1 | 10/2005 | Kim et al. | |
| 2006/0136342 A1* | 6/2006 | Nakamura | G06F 21/10 705/57 |
| 2007/0263875 A1 | 11/2007 | Kitaya et al. | |
| 2012/0250867 A1 | 10/2012 | Kambayashi et al. | |
| 2012/0257756 A1* | 10/2012 | Huang | H04L 9/0836 380/281 |
| 2013/0259227 A1 | 10/2013 | Hanatani et al. | |
| 2014/0173283 A1 | 6/2014 | Hanatani et al. | |
| 2015/0117298 A1* | 4/2015 | Hanatani | H04L 9/0833 370/312 |
| 2015/0188785 A1* | 7/2015 | Hanatani | H04L 9/0805 709/224 |
| 2015/0208210 A1* | 7/2015 | Hanatani | H04L 9/0833 370/312 |

FOREIGN PATENT DOCUMENTS

| | | |
|---|---|---|
| JP | 05-306405 B2 | 7/2013 |
| JP | 2014-121076 A | 6/2014 |
| JP | 5670272 B2 | 2/2015 |

OTHER PUBLICATIONS

U.S. Appl. No. 13/423,410, filed Mar. 19, 2012, 2012-0250867, Kambayashi et al.
U.S. Appl. No. 13/724,735, filed Dec. 21, 2012, 2013-0259227, Hanatani et al.
U.S. Appl. No. 14/132,148, filed Dec. 18, 2013, 2014-0173283, Hanatani et al.
U.S. Appl. No. 14/589,462, filed Jan. 5, 2015, Hanatani et al.
International Search Report dated Oct. 4, 2013 for PCT/JP2013/066538 filed Jun. 11, 2013 in English.
International Written Opinion dated Oct. 4, 2013 for PCT/JP2013/066538 filed Jun. 11, 2013.
Wen Tao Zhu, "A cost-Efficient Secure Multimedia Proxy System", IEEE Transactions on Multimedia, IEEE Service Center, Piscataway, NJ, USA, vol. 10, No. 6, Oct. 1, 2008, pp. 1214-1220.
Jeffrey B. Lotspiech ED—Alireza Seyedi, et al., "A Signature-Like Primitive for Broadcast-Encryption-Based Systems", Consumer Communications and Networking Conference, 2007. CCNC 2007. 20 07 4th IEEE, IEEE, PI, Jan. 1, 2007, pp. 1042-1047.
Fangming Zhao, et al., "Secure authenticated key exchange with revocation for smart grid", Innovative Smart Grid Technologies (ISGT), 2012 IEEE PES, IEEE, Jan. 16, 2012, pp. 1-8.
M. Baugher, et al., "The Group Domain of Interpretation", Network Working Group, RFC 3547, Jul. 2003, pp. 1-48.

* cited by examiner

COMMUNICATION CONTROL DEVICE, COMMUNICATION DEVICE, AND COMPUTER PROGRAM PRODUCT FOR DYNAMIC GROUP MANAGEMENT

CROSS-REFERENCE TO RELATED APPLICATION

This application is a continuation of International Application No. PCT/JP2013/066538, filed on Jun. 11, 2013, which claims the benefit of priority from Japanese Patent Application No. 2012-243157, filed on Nov. 2, 2012; the entire contents of which are incorporated herein by reference.

FIELD

Embodiments described herein relate generally to a communication control device, a communication device, and a computer program product.

BACKGROUND

In order to perform efficient management of a number of devices that are connected to a network; methods are known in which the devices are managed in groups. Such methods of managing devices in groups include a static group management method, in which a predetermined group structure is used, and a dynamic group management method, in which groups are generated and deleted depending on the situation.
Non-patent Literature 1: M. Baugher et al., "RFC 3547, The Group Domain of Interpretation", [online], July 2003, retrieved from the Internet: <URL: http://www.ietf.org/rfc/rfc3547.txt>

In the dynamic group management method, although flexible management can be performed depending on the situation, ensuring scalability remains an issue.

DETAILED DESCRIPTION

Figure 1:
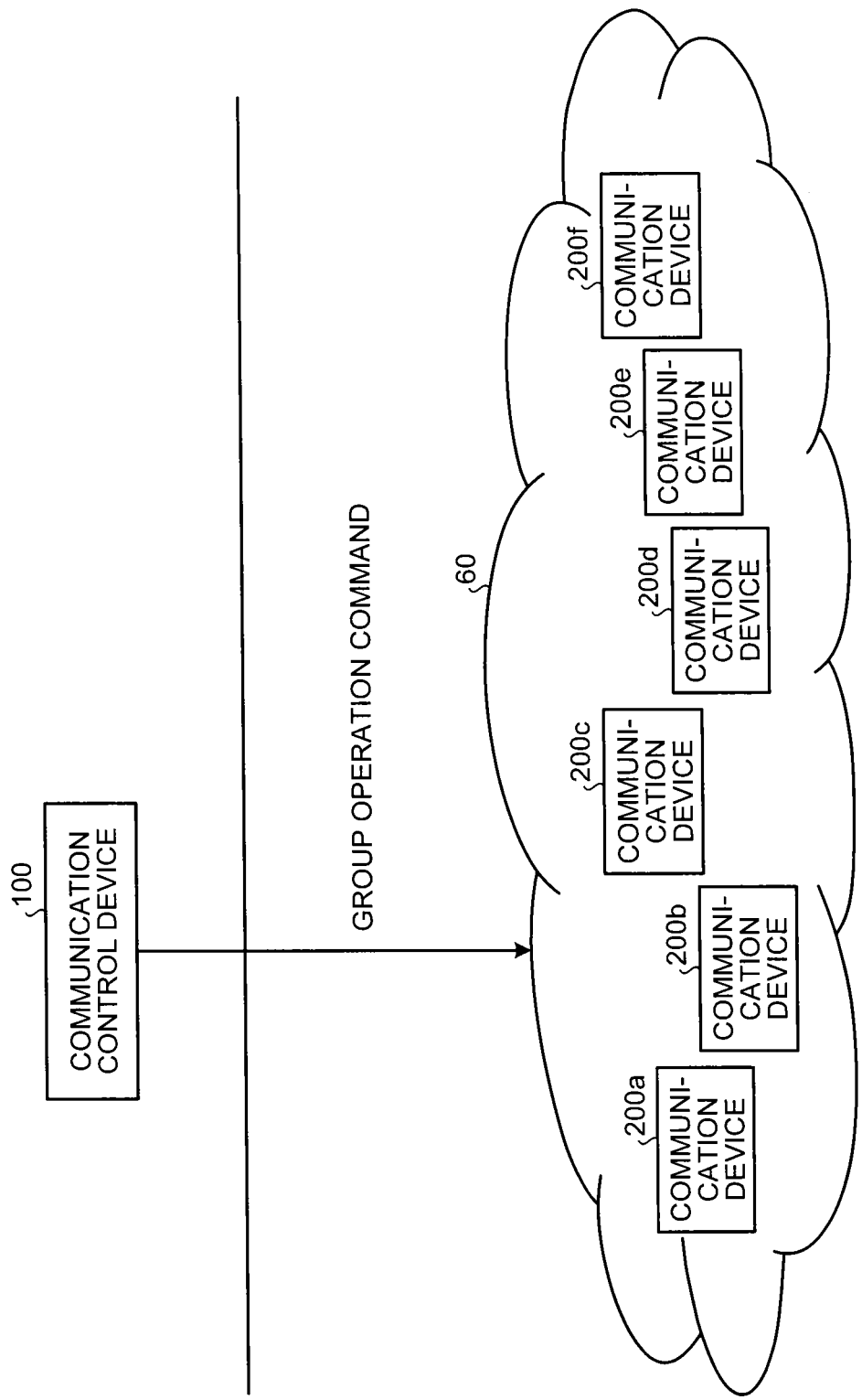
FIG. 1 is a block diagram illustrating a communication system according to an embodiment.

According to an embodiment, a communication control device includes an MKB generating unit, an extracting unit, and an output unit. When group information is updated, the MKB generating unit generates a media key block, from which a group key of the updated group can be derived and which contains a plurality of elements, on the basis of device keys of communication devices that belong to the updated group. For each piece of identification information for identifying one or more device IDs from among a plurality of device IDs identifying a plurality of communication devices; the extracting unit extracts, from the media key block, pieces of partial information each containing elements which can be processed using the device keys of the communication devices that are identified by the device IDs specified in the identification information. The output unit outputs the group ID of the updated group, the identification information, and the partial information to a plurality of communication devices that include all communication devices identified by the device IDs included in the updated group information.

Exemplary embodiments of a communication control device according the present invention will be described below in detail with reference to the accompanying drawings.

GDOI (the Group Domain of Interpretation) is a technology that makes use of multicasting so as to enable participation and withdrawal of group members as well as to enable secure distribution of group keys. In the GDOI, it is possible to perform group creation, group updating, and group key distribution. However, in the GDOI, every time a group member is updated, the key information (LKH_DOWNLOAD_ARRAY) that has a hierarchical structure gets updated in almost all members. For that reason, in the case when a single communication device belongs to a plurality of groups, it becomes necessary for that single communication device to hold a plurality of pieces of key information LKH_DOWNLOAD_ARRAY. In other words, a number of the key information LKH_DOWNLOAD_ARRAY that a single communication device holds depends on a number of groups to which the single communication device is belonged. As a result, efficient management becomes a difficult task to perform.

In that regard, in the present embodiment; group operations are performed with the use of a technology called an MKB (Media Key Block). By using an MKB, the affiliation to a plurality of groups can be efficiently managed with a single device key (a key ring equivalent to the key information LKH_DOWNLOAD_ARRAY). A number a device key that a single communication device holds does not depend on a number of groups to which the single communication device is belonged.

An MKB is data from which a media key for decoding contents, which are stored in media, can be derived by performing processing using the corresponding device key. An MKB contains one or more elements. A typical MKB contains one or more ciphertexts (elements) each of which is generated by encoding a single media key using one or more device keys. Moreover, an MKB can also contain information that enables identification of the device keys that are used in processing ciphertexts. In an MKB, the number of ciphertexts is determined depending on the corresponding device keys. Hence, depending on the corresponding device keys, there are cases when an MKB contains an enormous number of ciphertexts as elements.

In the present embodiment, a media key that is obtained by processing an MKB is used as a group key which is shared among one or more communication devices belonging to a particular group. Thus, by distributing an MKB from which a group key of a particular group can be derived if processing is done using the device keys that are held by the communication devices belonging to the particular group, it becomes possible to distribute the group key only to those communication devices which belong to the particular group. This fact can be put to use to perform group management of communication devices.

In the case of performing group management (group operations) using a particular MKB, the control is performed in such a way that a device that was able to process the MKB and retrieve a group key belongs to the group corresponding to the retrieved group key (if that device is not currently belonging to the group, then it newly participates in the group). On the other hand, the control is performed in such a way that a device that fails to retrieve a group key does not belong to the group corresponding to that group key (if that device is currently belonging to the group, then it withdraws itself from the group).

However, if the number of target devices is enormous, then there is a possibility that the MKB used for the purpose of group operations grows to a substantially large size. If such an MKB is distributed without modification over a communication network, then there is a possibility that the communication load becomes very large.

In that regard, in the present embodiment, in order to lower the network load, an MKB containing a plurality of ciphertexts as elements is divided and sent in portions. However, if it is assumed that the group control method as described above is to be implemented; then dividing and sending an MKB simply on the basis of ciphertexts may at times be insufficient to perform the intended group control. For example, if a communication device receives an MKB that has been divided in portions but is not able to retrieve the group key from that MKB; then that communication device withdraws itself from the corresponding group. However, in practice, there is a possibility that an MKB from which the communication device is able to retrieve the group key reaches at a later timing.

In order to avoid such a problem, appended to a particular MKB is the information that specifies a set of target communication devices for performing group operations using that MKB. For example, as the information that specifies a set of communication devices, it is possible to use the range of device IDs that enable identification of the target communication devices. For example, if the device IDs are assigned in a numerically continuous manner, then a first device ID and a second device ID can be used in representing the set of device IDs that belong to the range identified by the first device ID and the second device ID. Thus, the device IDs between the first device ID and the second device ID including the first device ID and the second device ID belong to the specified set of device IDs. Alternatively, if the device IDs are assigned according to a rule, then the range can be indicated with two device IDs as described above and the device IDs within the range can be identified according to the rule. Additionally, it can be determined whether or not a particular device ID is within the range. When a communication device receives an MKB to which is appended the information specifying the range of communication devices, then the communication device performs operations as indicated by a pseudo-code given below.

```
communication device checks if it is within the specified
   range;
   if (included in the set){
       process the MKB;
       if (the group key is successfully retrieved){
           if (belonging to the current group){
               update the group;
           }
           else{    if (not belonging to the current group){
               participate in the group;
           }
       }
       else{
           if (belonging to the current group){
               withdraw from the group;
           }
       }
   }
```

The communication device checks if it is included in the specified set (range). If included in the specified set, the communication device makes use of the device key held therein and processes the MKB. If the communication device not only successfully retrieves the group key but is also participating in the group corresponding to the retrieved group key, then the communication device updates the information of the group using the derived group key. In contrast, if the communication device successfully retrieves the group key but is not participating in the group corresponding to the retrieved group key, then the communication device participates in the group using the derived group key. Meanwhile, if the communication device fails to retrieve the group key but is participating in the group corresponding to the group key, then the communication device withdraws itself from that group.

In this way, in the present embodiment, a communication device first checks whether it itself is a target communication device for group operations. If the communication device is not a target communication device for group operations, then the group operations are not performed. As a result, even when an MKB that has been divided in portions is used, it becomes possible to avoid unintended group withdrawal operations.

Given below is the explanation regarding the details of the present embodiment. FIG. 1 is a block diagram illustrating an exemplary configuration of a communication system according to the present embodiment. As illustrated in FIG. 1, in the communication system according to the present embodiment, communication devices $200a$ to $200f$ are connected to a communication control device 100 via a network 60. Herein, as the network 60, it is possible to implement any network form such as the Internet. Each of the communication devices $200a$ to $200f$ need not be directly connected to the communication control device 100.

The configuration is not limited to include only a single communication control device 100. That is, it is possible to have a configuration including two or more communication control devices. Since the communication devices $200a$ to $200f$ have an identical configuration, sometimes they are simply referred to as communication devices 200. Moreover, the number of communication devices 200 is not limited to six.

As illustrated in FIG. 1, in the present embodiment, the communication control device 100 sends a group operation command to each communication device 200. The group operation command contains, for example, a group ID that enables identification of an updated group; identification information (such as the range of device IDs) that enables identification of the communication devices 200; and partial information that is obtained by dividing an MKB in portions.

Figure 2:
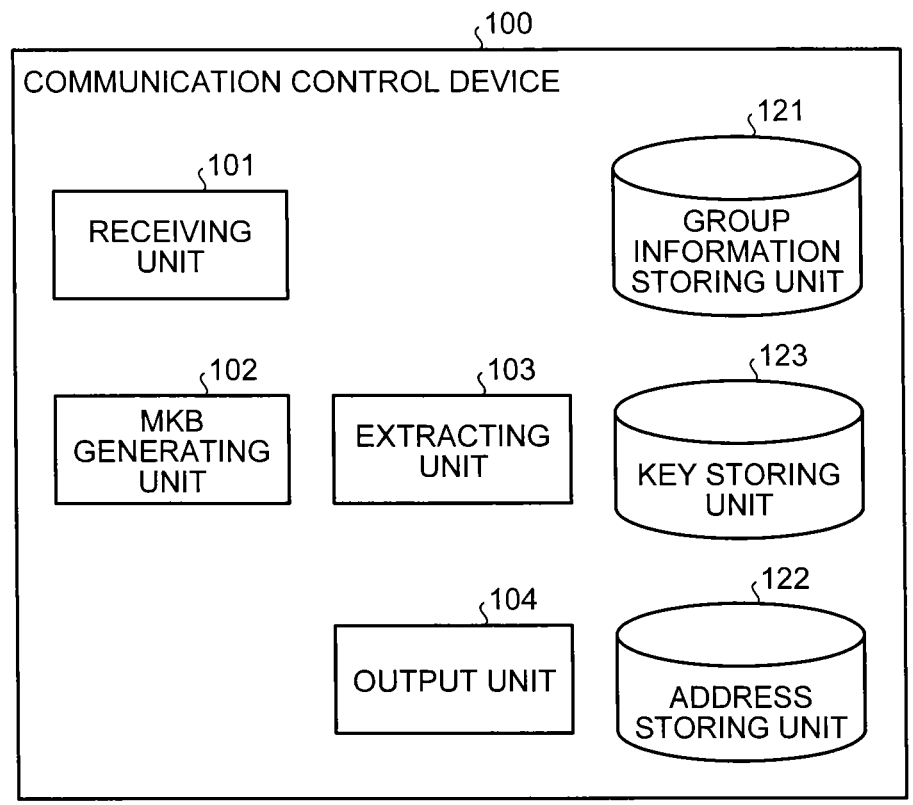
FIG. 2 is a block diagram illustrating a communication control device according to the embodiment.

FIG. 2 is a block diagram illustrating a configuration example of the communication control device 100. As illustrated in FIG. 2, the communication control device 100 includes a group information storing unit 121, an address storing unit 122, a key storing unit 123, a receiving unit 101, an MKB generating unit 102, an extracting unit 103, and an output unit 104.

The group information storing unit 121 is used to store group information that contains group IDs of such groups to which belong one or more communication devices 200 and contains device IDs that enable identification of the communication devices 200 which belong to the groups identified by the group IDs. Thus, in the group information storing unit 121, a group ID is stored in a corresponding manner to the device IDs of the communication devices 200 that belong to the group identified by the group ID.

In the present embodiment, it is assumed that the group information storing unit 121 is used to store, in advance, one or more group IDs. However, alternatively, instead of disposing the group information storing unit 121, it is possible to perform group operations on the basis of group information received from an external device.

In the address storing unit 122, information that enables identification of multicast groups to each of which belong one or more communication devices 200 (i.e., information such as multicast group IDs and multicast addresses) is stored in a corresponding manner to the device IDs of the communication devices 200 that belong to each multicast group. A multicast group is an example of a group that is managed independent of the groups which are subjected to group operations using MKBs. A multicast address is used, for example, to send information to the communication devices 200 having the corresponding device IDs by means of multicast communication. In the case of not using multicast communication (for example, in the case of using broadband communication), the configuration can be done without disposing the address storing unit 122.

In the present embodiment, it is assumed that the address storing unit 122 is used to store, in advance, one or more pieces of identification information. Alternatively, the configuration can be such that new information is added to the address storing unit 122 or the already-stored information is updated on the basis of information received from an external device.

The key storing unit 123 is used to store the device keys that are assigned to the communication devices 200. In the case when an MKB is generated by means of the CS (Complete Subtree) method (described later), the key storing unit 123 can be configured to store the device keys in a corresponding manner to the nodes of the tree structure.

The receiving unit 101 receives a variety of information from an external device such as the communication device 200. For example, the receiving unit 101 receives a group control request and information in which the target for group control is specified. Herein, a group control request points to a request for creating a new group or a request for modifying a group (a request for changing the communication devices 200 belonging to a particular group). For example, the configuration can be such that, from the input performed by an operator using an operating unit (not illustrated) such as a keyboard, the receiving unit 101 receives the group ID of the target group for operations and receives the device IDs of the communication devices 200 that are to be included in that target group for operations. Meanwhile, group control can be performed not only in the case when a group control request is received from an external device but also in the case when the communication control device 100 determines that it is necessary to perform group control. The receiving unit 101 sends the information (input information), in which a group control request and the target for group control is specified, to the MKB generating unit 102.

The MKB generating unit 102 generates an MKB on the basis of the group control request and the information in which the target for group control is specified. The generated MKB is then used in performing group control. For example, if input information is received in which updating of a group is specified, then the MKB generating unit 102 updates the group information in the group information storing unit 121 according to the input information. Once a group is updated, the MKB generating unit 102 makes use of the device keys of the communication devices 200 that belong to the updated group, so as to generate an MKB from which the group key of the updated group can be derived by only the communication devices 200 belonging to the updated group.

For example, the MKB generating unit 102 receives input of a list of device keys, which contains the device keys held in the communication devices 200 belonging to a group, and also receives input of the corresponding group key. Then, from the list of device keys and the group key, the MKB generating unit 102 generates an MKB from which the group key can be retrieved by only those communication devices which hold a device key specified in the list of device keys. As methods of generating an MKB, there are known methods such as the CS method, the SD (Subset Difference) method, and the LKH (Logical Key Hierarchy) method. Herein, it is possible to implement any one of those methods.

The MKB generating unit 102 ensures that the modification in the group information is reflected in the group information storing unit 121. Herein, the modification in the group information points to new addition of a group ID and new addition of a list of device IDs; deletion of a group ID and deletion of a list of device IDs, and updating of the list of device IDs corresponding to a particular group ID.

For each piece of identification information (for example, the range of device IDs) that enables identification of one or more device IDs from among the device IDs of the communication devices 200; the extracting unit 103 extracts, from an MKB, pieces of partial information each containing the elements which can be processed using the device keys of the communication devices 200 that are identified by the device IDs specified in the identification information. Moreover, the extracting unit 103 generates a group operation message that contains the extracted partial information. Herein, for example, the partial information contains a ciphertext that can be processed using the device keys of the communication devices 200 and contains the information that enables identification of the device keys used in processing the ciphertext. In a single piece of partial information, the number of ciphertexts is not limited to one. That is, a single piece of partial information can contain a plurality of ciphertexts.

Figure 3:
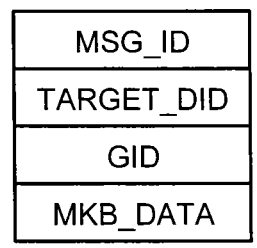
FIG. 3 is a diagram illustrating an exemplary data structure of a group operation message.

FIG. 3 is a diagram illustrating an exemplary data structure of a group operation message. As illustrated in FIG. 3, a group operation message contains MSG_ID, TARGET_DID, GID, and MKB_DATA. MSG_ID represents the information indicating the type of message. For example, in MSG_ID, a number is recorded which indicates that the message is a group operation message. In TARGET_DID, information is recorded which indicates the set of device IDs of the communication devices 200 that are targeted in the group operation message. For example, in TARGET_DID is recorded the range of device IDs of the communication devices 200 with respect to which group operations are to be performed.

GID represents the group ID of the group that is targeted in the group operation message. MKB_DATA represents the data body of the MKB. In the present embodiment, in MKB_DATA, not the entire MKB generated by the MKB generating unit 102 is set, but the partial information is set that contains some of the elements of the MKB and that is extracted by the extracting unit 103.

Given below is the explanation regarding an example of operations performed by the extracting unit 103. Assume that MKB_t is an MKB that is generated by the MKB generating unit 102. Moreover, an MSG_ID field, a TARGET_DID field, and an MKB_DATA field of a group operation message (referred to as "msg") are respectively written as msg.MSG_ID, msg.TARGET_DID, and msg.MKB_DATA.

The extracting unit 103 extracts, for example, the partial information from an entire MKB according to the range of device IDs. Herein, the device IDs are, for example, leaf numbers assigned to the communication devices 200. Explained below is an example of operations performed by the extracting unit 103. The range of all leaf numbers is assumed to be from 0 to ($2^{16}-1$). The extracting unit 103 divides the entire range of leaf numbers into a plurality of ranges. In the following explanation, the explanation is given a case in which the entire range of leaf numbers is divided into four ranges. All nodes covering the leaf numbers in the range from 0 to ($2^{13}-1$) are collected and defined as a first MKB (one piece of partial information). In an identical manner, all nodes covering the leaf numbers in the range from $2^{13}$ to ($2^{14}-1$) are defined as a second MKB (one piece of partial information). Moreover, all nodes covering the leaf numbers in the range from $2^{14}$ to ($2^{15}-1$) are defined as a third MKB (one piece of partial information). Furthermore, all nodes covering the leaf numbers in the range from $2^{15}$ to ($2^{16}-1$) are defined as a fourth MKB (one piece of partial information).

Given below is an exemplary pseudo-code representing the operations performed by the extracting unit 103.

```
for (id in [the information enabling identification of the
divided range of leaf numbers]){
    msg.MKB_DATA=φ;
        for (dev_id in [the device IDs included in the range of
leaf numbers indicated by id]){
            append [the data that is included in MKB_t and that covers
dev_id] to msg.MKB_DATA;
//[the data that is included in MKB_t and that covers dev_id]
can be φ.
        }
            if (msg.MKB_DATA≠φ){
                record the message number appropriate for msg.MSG_ID;
                msg.TARGET_DID=the device IDs included in the range
of leaf numbers indicated by id;
                in msg.GID, record the target group ID for operations;
                send msg. to the output unit 104;
            }
}
```

Figure 4:
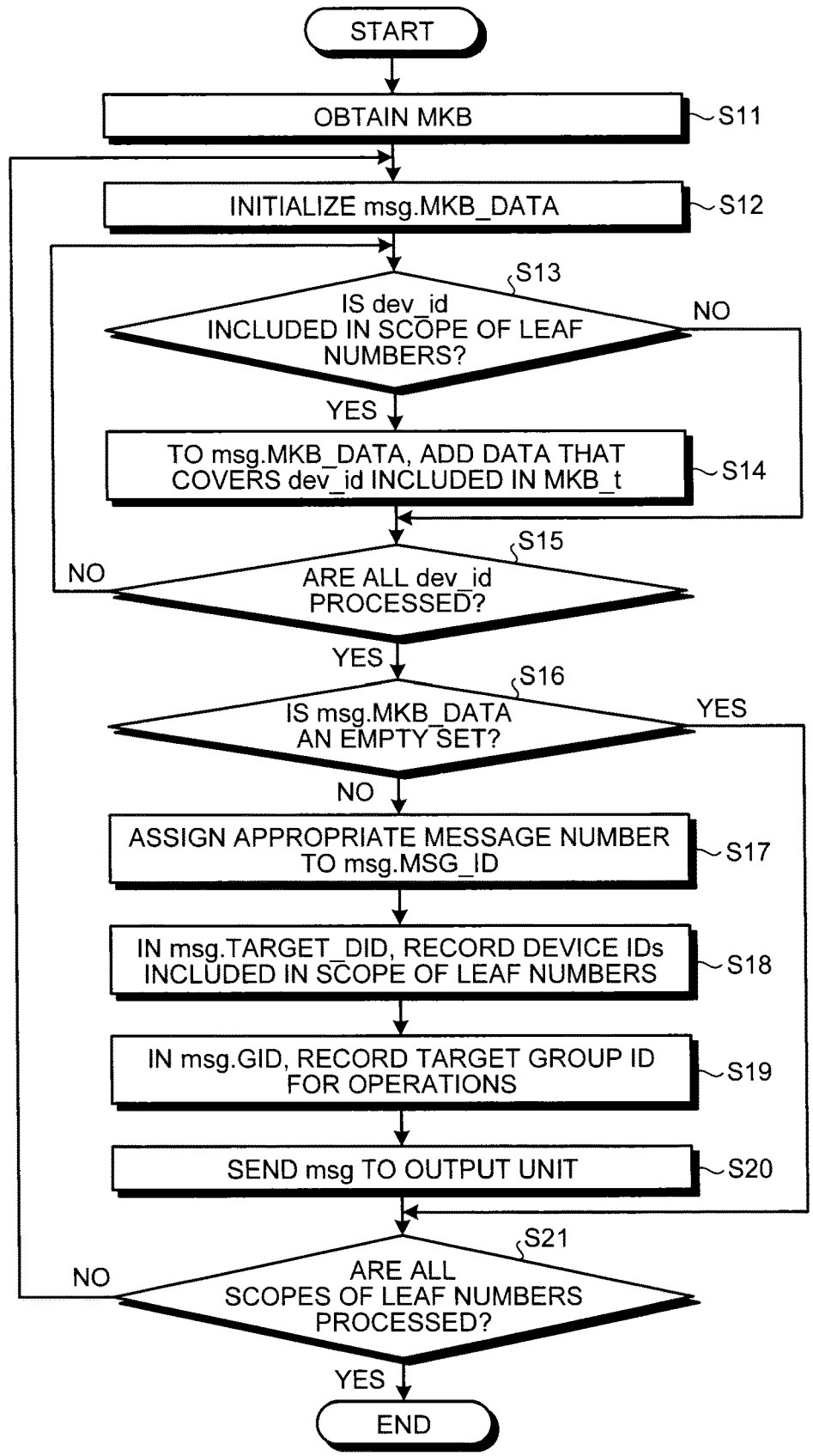
FIG. 4 is a flowchart for explaining exemplary operations performed by an extracting unit.

FIG. 4 is a flowchart for explaining exemplary operations performed by the extracting unit 103. The extracting unit 103 obtains an MKB that is generated by the MKB generating unit 102 (Step S11). For each divided range of leaf numbers (id), the following operations are performed. Firstly, the extracting unit 103 initializes msg.MKB_DATA to an empty set (Step S12). Then, the extracting unit 103 determines whether or not the device ID (dev_id) is included in the range of leaf numbers (id) (Step S13). If the device ID (dev_id) is included in the range of leaf numbers (id) (Yes at Step S13), then the extracting unit 103 extracts data that covers the device ID (dev_id) included in MKB_t and appends the extracted data to msg.MKB_DATA (Step S14). After the extracted data is added or if the device ID (dev_id) is not included in the range of leaf numbers (id) (No at Step S13); then the extracting unit 103 determines whether or not all device IDs (dev_id) that belong to the set of device IDs (dev_id), which is identified by the range of leaf numbers (id), are already processed (Step S15). If all device IDs (dev_id) are not yet processed (No at Step S15), then the system control returns to Step S13 and the operation is repeated. On the other hand, if all device IDs (dev_id) are already processed (Yes at Step S15); then the extracting unit 103 determines whether or not msg.MKB_DATA is an empty set (Step S16).

If msg.MKB_DATA is an empty set (Yes at Step S16), then the system control proceeds to Step S21. On the other hand, if msg.MKB_DATA is not an empty set (No at Step S16), then the extracting unit 103 assigns an appropriate message number to msg.MSG_ID (Step S17). Then, to msg.TARGET_DID, the extracting unit 103 assigns information that indicates the device IDs which are included in the range of leaf numbers indicated by id (Step S18). Moreover, the extracting unit 103 assigns the target group ID for operations to msg.GID (Step S19). Then, the extracting unit 103 sends msg, which at least contains (msg.MSG_ID, msg.TARGET_DID, msg.GID), to the output unit 104 (Step S20).

The extracting unit 103 determines whether or not all ranges of leaf numbers (id) have been processed (Step S21). If all ranges of leaf numbers (id) are not yet processed (No at Step S21), then the system control returns to Step S12 and the extracting unit repeats the operations with respect to the next unprocessed range of leaf numbers (id). On the other hand, when all ranges of leaf numbers (id) have been processed (Yes at Step S21), it marks the end of the operations.

The operations described above are only exemplary. For example, the operation at Step S13 can be replaced with an operation of reading the device IDs (dev_id) included in the leaf numbers identified by id; and the operation at Step S15 can be replaced with an operation of determining whether or not all device IDs (dev_id) included in the leaf numbers are processed. With that too, it becomes possible to divide an MKB on the basis of ranges of leaf numbers.

Herein, "id" that represents a range of leaf numbers can be represented also by a pair of the first leaf number of that range and the last leaf number of that range.

As a result of the operations described above, for each divided range of leaf numbers, a single msg is sent to the output unit 104.

In an MKB, for example, the data covering particular device IDs is defined in the following manner. Herein, it is assumed that the MKB is generated by means of the CS method in which, as described in the example given above, device keys are a subset of node keys, which are the encryption keys assigned to the nodes of a binary tree. Herein, different device keys invariably include encryption keys that are assigned to the nodes serving as different leaves. The encryption keys that are assigned to the nodes serving as leaves are called leaf keys.

In the present embodiment, it is assumed that each leaf has a leaf number assigned thereto for the purpose of enabling identification of the leaf. Moreover, the device IDs of the communication devices 200, which are managed by the communication control device 100, are assumed to be the leaf numbers of the leaf keys that are included in the device keys assigned to the communication devices 200.

However, such device IDs are only exemplary, and can be assigned independent of the leaf numbers assigned in the binary tree used in the CS method.

If the communication device 200 having a leaf number assigned thereto can process an MKB in a correct manner, then there exists data covering the leaf number. Herein, data covering device IDs points to a ciphertext that is obtained by encoding a group key using a node key, as well as points to an index that indicates a node which is assigned the node key to specify the node key; and a sub binary tree whose root node is indicated by the index contains the nodes to which are assigned leaf numbers, which are the device IDs, as leaves. On the other hand, if the communication device 200 having a leaf number assigned thereto cannot process an MKB in a correct manner; then there exists no data covering the leaf number. In that case, the data covering device IDs is assumed to be an empty set ϕ. The data covering device IDs corresponds to the partial information containing some of the elements of an MKB.

Thus, when the communication device 200 can process an MKB in a correct manner, it points to the fact that the communication device 200 can derive the group key from that MKB using the device key held in that communication device 200. On the other hand, when the communication device 200 cannot process an MKB in a correct manner, it points to the fact that the communication device 200 cannot derive the group key from that MKB even with the use of every piece of information held in the communication device 200.

Figure 5:
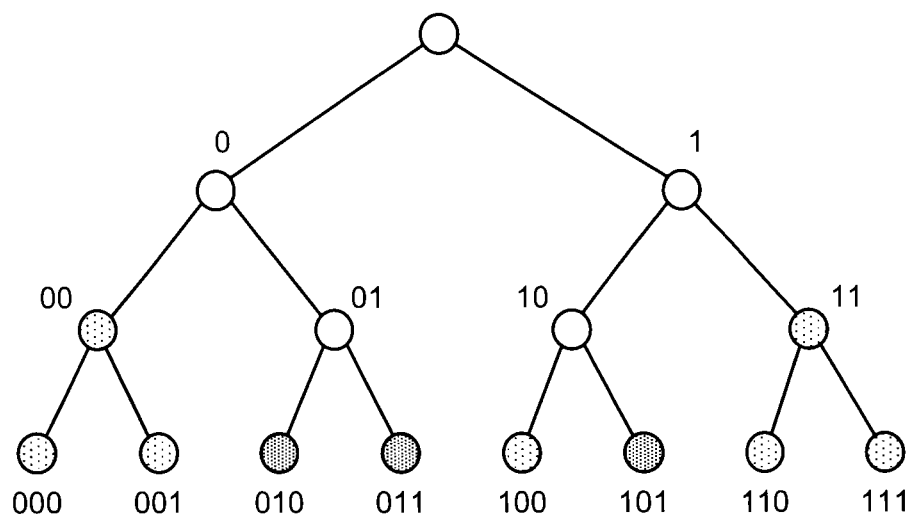
FIG. 5 is a diagram illustrating a specific example in the case of using an MKB generated by means of the CS method.

FIG. 5 is a diagram illustrating a specific example in the case of using an MKB generated by means of the CS method. Herein, a leaf number is represented as a string starting from "0" or "1" and having the string length of three. Regarding the path starting from the root node to a leaf (end node), "0" is assigned in the case of moving leftward and "1" is assigned in the case of moving rightward. As a result, the leaf numbers (from "000" to "111") are obtained. The node indices ("0", "1", "00", "01", "10", and "11") are also assigned in an identical manner. Each node as well as each leaf is assigned with an encryption key. For example, to the node having the index "00" (meanwhile, in the following explanation, the node having an index "n" is also referred to as "node n"), a key k(00) is assigned.

In the example illustrated in FIG. 5, an MKB is provided that has the following three elements that respectively correspond to the node 00, the leaf having the leaf number 100 (meanwhile, in the following explanation, the leaf having a leaf number "m" is also referred to as "leaf m"), and the node 11.

(00, Enc[k(00)](Kg)), (100, Enc[k(100)](Kg)), and (11, Enc[k(11)](Kg)).

Herein, "Kg" represents a group key and "Enc[k(00)](Kg)" represents the data obtained by encrypting the group key "Kg" with "k(00)".

In the communication devices 200 corresponding to the leaves 010, 011, and 101; the abovementioned MKB cannot be processed in a correct manner. That is, even if the device keys or every other piece of information held in the communication devices 200 corresponding to the leaves 010, 011, and 101 are used; the group key "Kg" cannot be derived from the MKB.

Meanwhile, an MKB that is generated by means of a method other than the CS method can also be divided in portions. For example, consider an MKB that is generated by means of the SD method. In an identical manner to the CS method, in the SD method too, the leaf numbers assigned to the communication devices 200 serve as the device IDs.

However, in the SD method, the covering condition is different than that in the CS method. That is, in the SD method, if the communication device 200 assigned with a particular leaf number is able to process an MKB in a correct manner, then there exists a pair of nodes (a node and a descendant node thereof) in which the particular leaf number is included in the tree having a particular node as the root node but is not included in the tree having a descendant node of that particular node as the root node. Thus, the data covering device IDs points to a group key that is encrypted using an encryption key assigned to the abovementioned pair of nodes (a node and a descendant node thereof) and points to a pair of indices specifying the nodes included in the pair of nodes.

On the other hand, if the communication device 200 assigned with a particular leaf number is not able to process an MKB in a correct manner, then there exist no nodes of a tree covering that leaf number. That is, regarding a particular leaf number assigned to such a communication device which is not able to process an MKB in a correct manner, either there exists a pair of nodes (a node and a descendant node thereof) in which the particular leaf number is included in the tree having the node as the root node and is also included in the tree having a descendant node of the particular node as the root node; or there exists a node including the particular leaf number but there exists no pair of nodes (a node and a descendant node thereof). In that case, the data covering device IDs is assumed to be an empty set ϕ.

Figure 6:
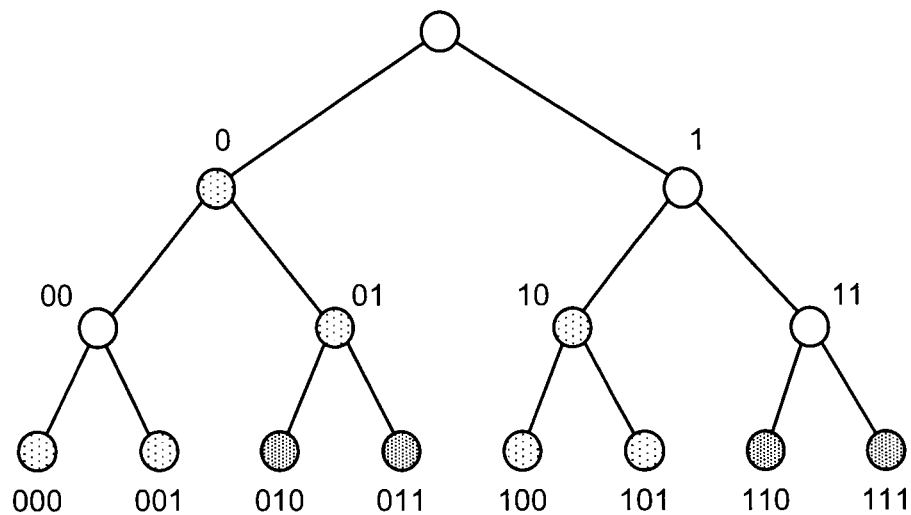
FIG. 6 is a diagram illustrating a specific example in the case of using an MKB generated by means of the SD method.

FIG. 6 is a diagram illustrating a specific example in the case of using an MKB generated by means of the SD method. In an identical manner to the example of using the CS method (FIG. 5), a leaf number is represented as a string starting from "0" or "1" and having the string length of three. Each pair of a node and a descendant node thereof has an encryption key assigned thereto. For example, to the pair of the node 0 and the node 01, a key k(0, 01) is assigned. If all such keys are to be held, it becomes necessary to secure a large memory area. For that reason, with the aim of reducing the memory area, the configuration can be such that the one-way function is applied and only the keys that are used in serially calculating the encryption keys are stored.

In the example illustrated in FIG. 6, an MKB is provided that has the following two elements that respectively correspond to the pair of the node 0 and the node 00 and the pair of the node 10 and the leaf 101.

((0, 01), Enc[k(0, 01)](Kg)) and ((10, 101), Enc[k(10, 101)](Kg))).

Thus, in the communication devices 200 corresponding to the leaves 010, 011, 101, 110, and 111; the abovementioned MKB cannot be processed in a correct manner. At that time, the data covering the leaf 000 becomes ((0, 10), Enc[k(0, 01)] (Kg)). Herein, "Kg" represents a group key and "Enc [k(0, 01)](Kg)" represents the data obtained by encrypting the group key "Kg" with "k(0, 01)". Moreover, since the communication device 200 corresponding to the leaf 011 cannot correctly process the MKB, the data covering the leaf 011 is an empty set ϕ. That is, the leaf 011 is assigned with a device key in such a way that it does not hold k(0, 01) or it cannot derive k(0, 01). In an identical manner, for example, the data covering the node 100 becomes ((10, 101), Enc[k(10, 101)](Kg)).

Regarding an MKB generated by means of a method other than the CS method and the SD method; the extracting unit 103 can be configured to extract, from the entire MKB and according to the configuration of the MKB, partial information that enables processing using the device keys of the communication devices 200 that are identified by the device IDs within the specified range.

Returning to the explanation with reference to FIG. 2, when the group information is updated, the output unit 104 outputs output information that contains the group ID of an updated group, the identification information (such as the range of device IDs), and the partial information. For example, by means of multicasting, the output unit 104 sends, as the output information, a group operation message to a multicast group to which belong the communication devices 200 having the device IDs that are specified in TARGET_DID of the group operation message. Thus, by allowing the output of the output unit 104 to also reach the communication devices 200 that are not to be subjected to a group change; it becomes possible to reduce, as compared to the opposite case, the calculation cost that is necessary for the output unit 104 to determine the output destination.

Moreover, the output unit 104 can also be configured to send the abovementioned information to a multicast group to which belong the communication devices 200 that are included in a pre-updating group but are not included in the corresponding updated group. Although such communication devices 200 belong to a multicast group, they withdraw themselves from the updated group due to their incapability to process the partial information in a correct manner. In this way, using an MKB that has been divided in portions, it is possible to issue a command that instructs withdrawal from a group. By issuing such a command, it becomes possible to appropriately manage the information that the communication devices 200 need to hold.

Meanwhile, the command that instructs withdrawal from a group may not be issued to the communication devices 200 that are not included in the updated group. That is because the communication devices not included in the updated group cannot derive the updated group key in response to an updating command and cannot participate in the updated group. With such a configuration, there are times when it becomes possible to reduce the volume of commands that the communication control device 100 needs to issue.

The output unit 104 outputs the output information to such a set (group) of communication devices 200 that includes the communication devices 200 which are managed independent of the target groups to be subjected to group operations using an MKB and that includes all the communication devices 200 for which at least the corresponding groups are updated. Herein, a set of communication devices 200 points to a collection of a plurality of communication devices 200 and is not necessarily consistent with the groups having group IDs assigned thereto. Examples of a set of communication devices 200 includes a set of communication devices 200 that receive data by means of a particular multicast communication; and includes a set of communication devices 200 that receive data by means of broadcast communication, that is, a set of all communication devices 200. For example, by means of one or more multicast communications or broadcast communications, the output unit 104 can output the output information to a set or a group of communication devices 200 that include lists of device IDs. In the case of sending the output information by means of multicast communication, the output unit 104 outputs the output information to, for example, one or more addresses (multicast addresses) corresponding to the target device IDs for distribution from among the addresses stored in the address storing unit 122.

In the example given above, the extracting unit 103 divides an MKB in portions according to the device IDs included in the range of device IDs that is specified in the identification information. However, it is also possible to think of different operations for the extracting unit 103. That is, it is possible to think of an MKB division method in which partial information of an MKB is established from a previously-received MKB and the identification information, which specifies the range of device IDs, is established from the partial information of the MKB and the device IDs belonging to updated groups.

An example of that is given below. Herein, the MKB illustrated in FIG. 5 is written as {M1, M2}, where "M1" and "M2" are two mutually exclusive subsets of the MKB. In FIG. 5, M1={(00, Enc[k(00)](Kg))} and M2={(100, Enc[k(100)](Kg)), (11, Enc[k(11)](Kg))} is illustrated. The operations performed by the extracting unit 103 are as follows.

```
from an MKB, generate [subsets of the MKB];
for (m in [subsets of the MKB]){//m points to M1 or M2
    [the set of device IDs that can process m]=φ;
        for (node-data in [the elements of m]){
            for (dev_id in [the device IDs covered by node-data]){
                add dev_id to [the set of device IDs that can process m];
            }
        }
    generate the identification information of the set of device IDs including [the set of device IDs that can process m];
}
if (the sets identified by the generated identification information have common elements){
    adjust the identification information so as to have no common elements;
}
send all pieces of identification information and corresponding elements m to the output unit 104;
```

Firstly, elements are selected from an MKB and subsets of the MKB are generated. In the example described above, (00, Enc[k(00)](Kg)) is selected and set as M1; and (100, Enc[k(100)](Kg)) and (11, Enc[k(11)](Kg)) are selected and set as M2. Thus, [subsets of the MKB]={M1, M2} is established. However, that selection is only exemplary, and the elements can be selected by an arbitrary method.

For each element m included in [subsets of the MKB], the following operations are performed. Firstly, [the set of device IDs that can process m] is initialized and, for every node-data included in [the elements of m], dev_id covered by node-data is identified and is added to [the set of device IDs that can process m]. By performing the abovementioned operation with respect to all node-data included in each element m, [the set of device IDs that can process m] is obtained.

Then, identification information is generated regarding the set of all device IDs included in [the set of device IDs that can process m]. For example, if the device IDs are assigned in a numerically continuous manner; then a set is formed that includes, as elements, the device IDs included in the range represented by the device ID having the smallest numerical value and the device ID having the largest numerical value. The identification information of the set is the pair of the device ID having the smallest numerical value and the device ID having the largest numerical value. This is only exemplary, and the method of determining the identification information is not limited to the method described above.

Once the identification information regarding all elements m is obtained, it is checked whether the set identified by all pieces of identification information has common elements.

If identification information having common elements is found, then adjustment is performed in such a way that there are no common elements among the pieces of identification information. For example, during the adjustment, from two sets having common elements, a set including only the common elements as well as two sets including no common elements can be generated; and three pieces of identification information corresponding to those three sets can be newly generated. Alternatively, for example, from two sets having common elements, a set can be generated by excluding common elements from one of the two sets and identification information for identifying that set can be newly generated.

In the case of not having any common elements, the abovementioned adjustment operation is not performed.

Meanwhile, by referring to the group information storing unit 121, the identification information can be generated to also contain such communication devices 200 that are included in the pre-updating groups but are not included in the updated groups.

For example, instead of initializing [the set of device IDs that can process m] to an empty set, the identification information can be generated by initializing [the set of device IDs that can process m] to a list of such devices that are included in the pre-updating groups but are not included in the updated groups. That is because, in all of [the sets of device IDs that can process m] that are generated, although there is duplication of device IDs that are included in the pre-updating groups but are not included in the updated groups, the identification information is adjusted to have no common elements. That results in the elimination of the duplicate device IDs.

Alternatively, after initializing [the set of device IDs that can process m] to an empty set and after generating [the set of device IDs that can process m] by performing the abovementioned operations; at the time of adjusting the identification information to have no common elements, an additional adjustment can be performed in such a way that all device IDs which are included in the pre-updating groups but are not included in the updated groups are included in one of the pieces of identification information.

The extracting unit 103 sends one or more pieces of identification information that are generated and the elements m to the output unit 104.

Figure 7:
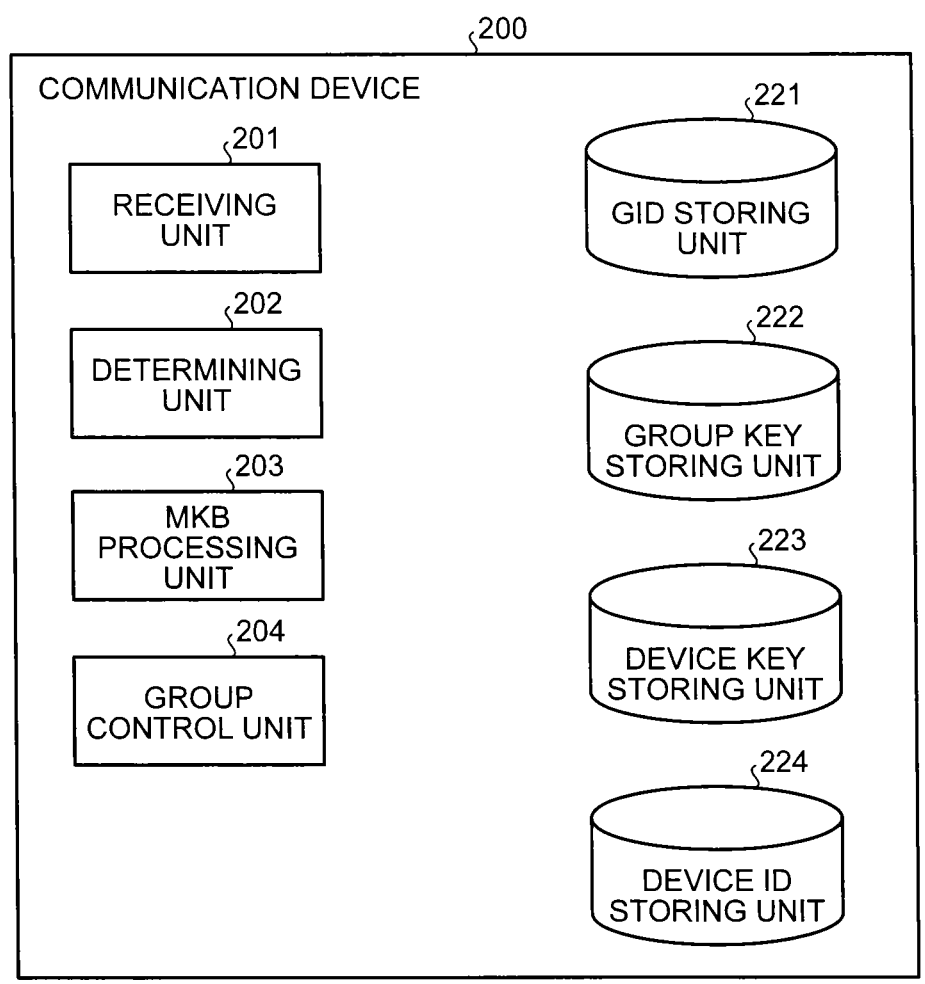
FIG. 7 is a block diagram illustrating a communication device according to the embodiment.

FIG. 7 is a block diagram illustrating a configuration example of the communication device 200. As illustrated in FIG. 7, the communication device 200 includes a GID storing unit 221, a group key storing unit 222, a device key storing unit 223, a device ID storing unit 224, a receiving unit 201, a determining unit 202, an MKB processing unit 203, and a group control unit 204.

The GID storing unit 221 is used to store the group ID (GID) of the group to which the communication device 200 belongs. The group key storing unit 222 is used to store the group key of the group that is identified by the group ID stored in the GID storing unit 221. The device key storing unit 223 is used to store the device key of the communication device 200. The device ID storing unit 224 is used to store the device ID of the communication device 200.

The receiving unit 201 receives a variety of information from the communication control device 100 and from other external devices such as the other communication devices 200. For example, the receiving unit 201 receives a group operation message from the communication control device 100. Moreover, the receiving unit 201 receives output information by means of multicast communication and broadcast communication. The receiving unit 201 determines whether a received message is a group operation message. If the received message is not a group operation message, then the received message is sent to another module (not illustrated) for processing in which the message is supposed to be processed. On the other hand, if the received message is a group operation message, the data of the message is sent to the determining unit 202.

The determining unit 202 determines whether or not the identification information (TARGET_DID) in a group operation message indicates the device ID that is stored in the device ID storing unit 224. If the identification information does not indicate the device ID, then the corresponding communication device 200 is not the target device for using the group operation message. As a result, the operations with respect to the group operation message are terminated. On the other hand, if the identification information indicates the device ID, then the corresponding communication device 200 is the target device for using the group operation message. As a result, the group operation message is sent to the MKB processing unit 203.

When it is determined that the identification information (TARGET_DID) indicates the device ID that is stored in the device ID storing unit 224, the MKB processing unit 203 performs MKB processing to generate a group key from the partial information (MKB_DATA) included in the group operation message and from the device key stored in the device key storing unit 223. If a group key is obtained as a result of MKB processing, it means that the corresponding communication device 200 belongs to the group that is identified by the GID. Then, the MKB processing unit 203 sends the GID and the group key to the group control unit 204.

The group control unit 204 stores the GID in the GID storing unit 221 and stores the group key in the group key storing unit 222. If a GID is already stored in the GID storing unit 221, then the group control unit 204 updates the stored GID with the GID specified in the group operation message.

On the other hand, if no group key is obtained as a result of MKB processing, it means that the corresponding communication device 200 is not supposed to belong to the group that is identified by the GID. Hence, in case the communication device 200 is belonging to the group that is identified by the GID, then that communication device 200 needs to withdraw itself from that group. For that reason, the MKB processing unit 203 sends the GID and a notification of not being able to obtain the group key to the group control unit 204.

Then, the group control unit 204 empties the GID storing unit 221 and the group key storing unit 222. That is, if a GID or a group key is already stored, the group control unit 204 deletes it.

Meanwhile, each storing unit mentioned above can be configured with any type of a commonly-used memory medium such as an HDD (Hard Disk Drive), an optical disk, a memory card, or a RAM (Random Access Memory).

Moreover, the receiving unit 101, the MKB generating unit 102, the extracting unit 103, and the output unit 104 in the communication control device 100, as well as the receiving unit 201, the determining unit 202, the MKB processing unit 203, and the group control unit 204 in the communication device 200 can be implemented by executing programs in a processor such as a CPU (Central Processing Unit), that is, can be implemented using software; or can be implemented using hardware such as integrated circuits (ICs); or can be implemented using a combination of software and hardware.

Figure 8:
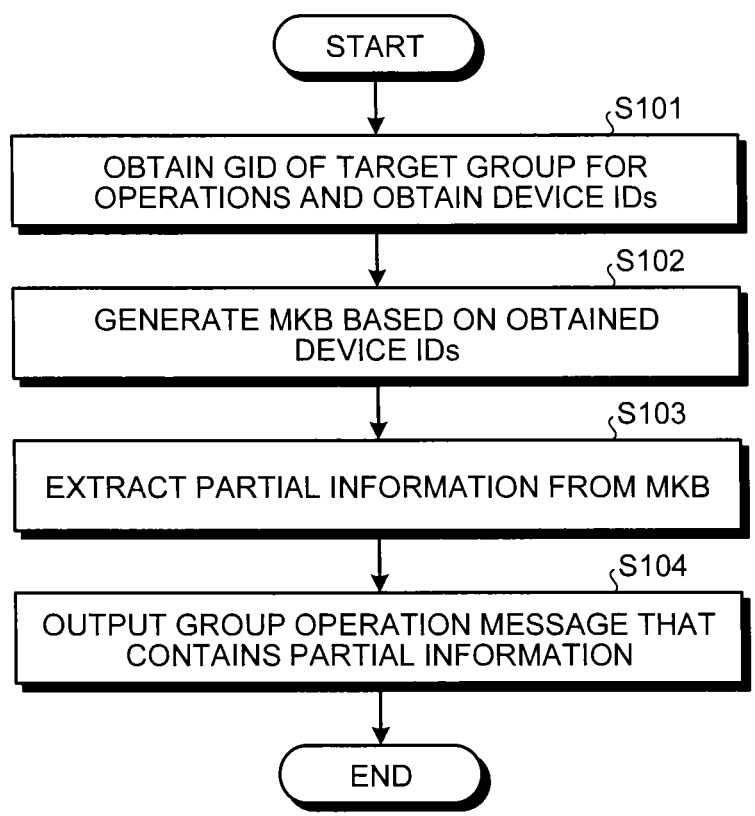
FIG. 8 is a flowchart for explaining an example of a communication control operation performed according to the embodiment.

Explained below with reference to FIG. 8 is a communication control operation performed by the communication control device 100 according to the present embodiment. FIG. 8 is a flowchart for explaining an example of the communication control operation performed according to the present embodiment.

The receiving unit 101 obtains (receives) the GID of the target group for operations and the device IDs of the communication devices 200 belonging to that group (Step S101). Then, the MKB generating unit 102 generates an MKB based on the obtained device IDs (Step S102). For example, the MKB generating unit 102 generates an MKB form which the communication devices 200 corresponding to the obtained device IDs can obtain a group key.

Subsequently, the extracting unit 103 extracts partial information from the generated MKB (Step S103). Firstly, the extracting unit 103 divides the range of device IDs of the communication devices 200 into a plurality of ranges. For example, as described above, the extracting unit 103 divides the range of device IDs (the range of leaf numbers) into four ranges. Then, for each piece of identification information that enables identification of a divided range, the extracting unit 103 extracts, from the MKB, partial information that specifies the portion processible by the device keys of the communication devices 200 that are identified by the device IDs included in the range which is identified in the identification information. Then, the extracting unit 103 generates a group operation message containing the extracted partial information.

The output unit 104 outputs the group operation message (Step S104). Herein, the group operation message is generated for each TARGET_DID. Hence, the output unit 104 outputs the group operation messages equal in number to the number of TARGET_DID.

Figure 9:
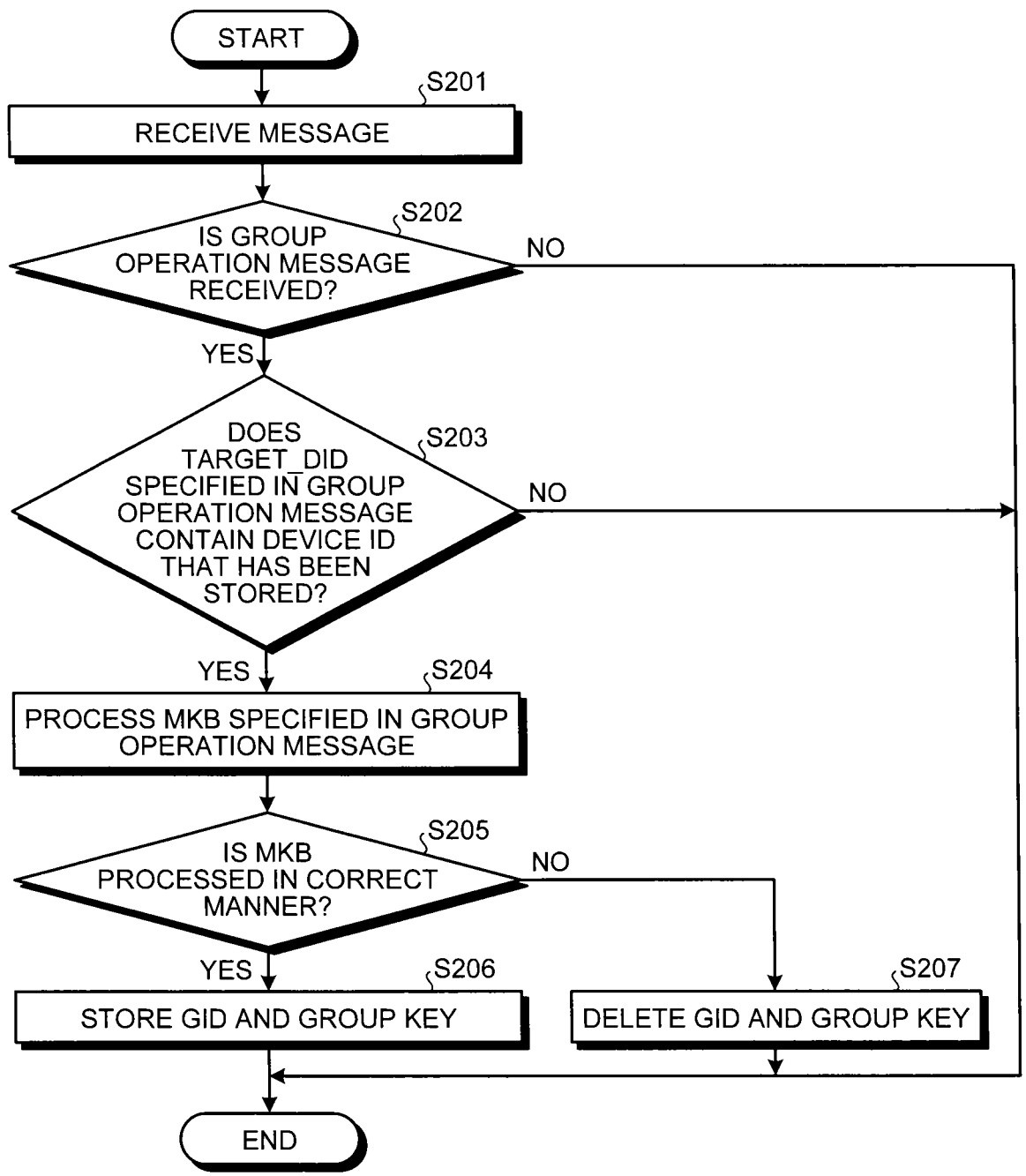
FIG. 9 is a flowchart for explaining an example of a group control operation performed according to the embodiment.

Explained below with reference to FIG. 9 is a group control operation performed by the communication device 200 according to the present embodiment. FIG. 9 is a flowchart for explaining an example of the group control operation performed according to the present embodiment.

The receiving unit 201 receives a message from an external device such as the communication control device 100 (Step S201). Then, the receiving unit 201 determines whether or not the received message is a group operation message (Step S202). If the received message is not a group operation message (No at Step S202), then the group control operation is terminated. A message other than a group operation message is sent to another module in which the message is supposed to be processed, and is appropriately processed.

On the other hand, if the received message is a group operation message (Yes at Step S202), then the determining unit 202 determines whether or not TARGET_DID specified in the group operation message contains the device ID stored in the device ID storing unit 224 (Step S203).

If TARGET_DID does not indicate the device ID (No at Step S203), then the group control operation is terminated because the corresponding communication device 200 is not the target device for using the group operation message. On the other hand, if TARGET_DID indicates the device ID (Yes at Step S203), then the MKB processing unit 203 processes the MKB (MKB_DATA) specified in the group operation message (Step S204).

Then, the MKB processing unit 203 determines whether or not the MKB was processed in a correct manner (Step S205). If the MKB was processed in a correct manner (Yes at Step S205); then the group control unit 204 stores the GID, which is specified in the group operation message, in the GID storing unit 221 and stores the group key, which is obtained as a result of MKB processing, in the group key storing unit 222 (Step S206). On the other hand, if the MKB was not processed in a correct manner (No at Step S205); then the group control unit 204 deletes the GID, which is specified in the group operation message, from the GID storing unit 221 and deletes the group key from the group key storing unit 222 (Step S207).

In this way, in the communication control device according to the present embodiment, it becomes possible to perform dynamic group management while ensuring scalability. Moreover, for the purpose of performing group management, only the partial information that is extracted from an MKB is sent instead of sending the entire MKB. Hence, it becomes possible to reduce the communication load. At that time, the partial information is sent along with the information used in setting the range of communication devices to be subjected to group operations. Hence, it becomes possible to avoid unintended group operations.

First Modification Example

According to the abovementioned embodiment, the extracting unit 103 extracts pieces of partial information each containing some elements of an MKB which covers the device IDs identified by particular identification information, and sends the extracted partial information via the output unit 104. However, instead of sending the extracted partial information without modification; it is also possible to further divide the identification information into portions equal to or smaller than a predetermined size, to re-divide the partial information according to the divided portions of identification information, and to send each divided portion of identification information and each re-divided portion of partial information via the output unit 104. Alternatively, instead of performing divisions equal to or smaller than a predetermined size, the identification information and the partial information can be re-divided so as to ensure that the partial information sent to each multicast group has the same size. Moreover, that predetermined size can be changed depending on the situation. In this way, by reconfiguring the identification information and the partial information, it becomes possible to send commands suitable for various conditions by taking into account the communication speed, the capability such as the volume of the temporary storage area in the communication devices 200, and the characteristics of the multicast groups.

Second Modification Example

According to the abovementioned embodiment, the extracting unit extracts, from an MKB, pieces of partial information each containing some elements of the MKB; generates identification information with respect to each piece of partial information; and sends the partial information and the identification information via the output unit. However, if one or more pieces of partial information are to be sent to a particular multicast group, then reconfiguration such as bundling those pieces of partial information together can be done and the bundled information can be sent via the output unit 104. Alternatively, in an identical manner to the first modification example, the partial information to be sent can be re-divided into portions equal to or smaller than a predetermined size. Alternatively, instead of performing divisions equal to or smaller than a predetermined size, the sets of partial information to be sent to each multicast group can be re-divided so as to ensure that the partial information sent to each multicast group has the same size. Moreover, the predetermined size can be different for each multicast group. In this way, by reconfiguring the partial information, it becomes possible to send commands suitable for various conditions by taking into account the communication speed, the capability such as the volume of the temporary storage area in the communication devices 200, and the characteristics of the multicast groups.

Figure 10:
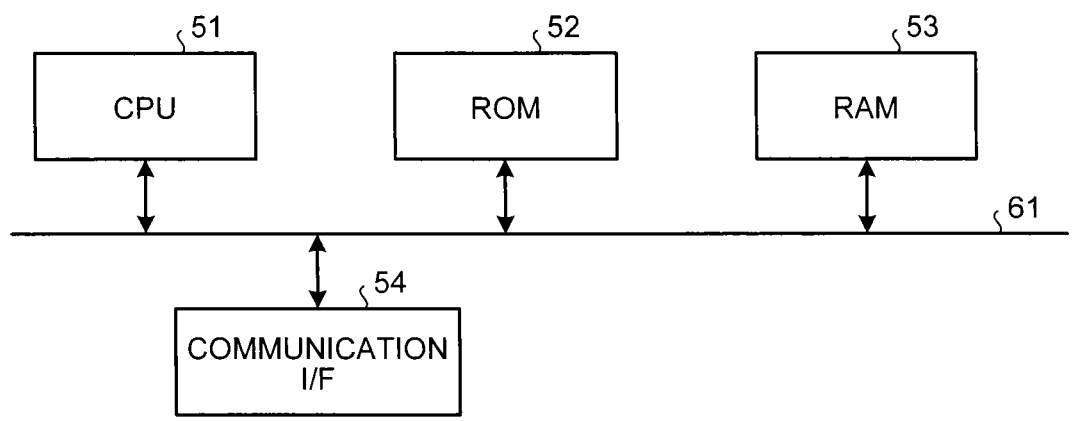
FIG. 10 is a hardware configuration diagram of the device according to the embodiment.

Explained below with reference to FIG. 10 is a hardware configuration of the communication control device according to the present embodiment. FIG. 10 is an explanatory diagram illustrating a hardware configuration of the communication control device according to the present embodiment.

The communication control device according to the present embodiment includes a control device such as a CPU (Central Processing Unit) 51; memory devices such as a ROM (Read Only Memory) 52 and a RAM (Random Access Memory) 53; a communication I/F 54 that performs communication by establishing connection with a network; and a bus 61 that interconnects the constituent elements.

The programs executed in the devices (the communication control device and the communication devices) according to the present embodiment are stored in advance in the ROM 52.

Alternatively, the programs executed in the devices according to the present embodiment can be recorded in the form of installable or executable files in a computer-readable recording medium such as a CD-ROM (compact disk read only memory), a flexible disk (FD), a CD-R (compact disk readable), or a DVD (digital versatile disk).

Still alternatively, the programs executed in the devices according to the present embodiment can be saved as downloadable files on a computer connected to the Internet or can be made available for distribution through a network such as the Internet.

The programs executed in the devices according to the present embodiment can make a computer function as the constituent elements mentioned above. In that computer, the CPU 51 can read the computer-readable programs from a memory medium and execute them after loading them in a main memory device.

While certain embodiments have been described, these embodiments have been presented by way of example only, and are not intended to limit the range of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the range and spirit of the inventions.

What is claimed is:

1. A communication device that is connected to a communication control device, the communication device comprising:
a first memory configured to store therein a first group ID for identifying a group;
a second memory configured to store therein a first device ID for identifying the communication device; and
one or more processors configured to:
receive identification information for identifying one or more device IDs and partial information that is extracted from a media key block from the communication control device connected to the communication device, the partial information being information from which a group key is derivable;
determine whether or not the first device ID is included in the device IDs identified in the identification information;
when the first device ID is included in the device IDs identified in the identification information, perform MKB processing to generate the group key from the partial information and from a device key of the communication device;
receive a second group ID, the identification information, and the partial information from the communication control device;
determine whether or not the second group ID matches with the first group ID, and when the MKB processing is not performed in a correct manner and when the second group ID matches with the first group ID;
delete the first group ID from the first memory.

2. The communication device according to claim 1, wherein
the one or more processor is further configured to, when the MKB processing is performed in a correct manner, update the first group ID with a group ID for identifying a group corresponding to the generated group key.

* * * * *